United States Patent [19]

Kataoka et al.

[11] Patent Number: 5,460,913
[45] Date of Patent: Oct. 24, 1995

[54] TONER FOR DEVELOPING ELECTROSTATIC IMAGE AND PROCESS FOR THE PREPARATION THEREOF

[75] Inventors: Hiroaki Kataoka; Hajime Yamazaki; Shinji Otani; Hiroshi Hamada, all of Tokyo, Japan

[73] Assignee: Hodogaya Chemical Co., Ltd., Tokyo, Japan

[21] Appl. No.: 248,188

[22] Filed: May 24, 1994

[30] Foreign Application Priority Data

May 24, 1993 [JP] Japan ................... 5-142551

[51] Int. Cl.$^6$ ..................... G03G 9/083
[52] U.S. Cl. ................... 430/106.6; 430/137
[58] Field of Search ................ 430/106.6, 137

[56] References Cited

U.S. PATENT DOCUMENTS

| | | | |
|---|---|---|---|
| 4,097,620 | 6/1978 | Lu | 427/127 |
| 4,218,530 | 8/1980 | Lu | 430/107 |
| 4,421,660 | 12/1983 | Sole | 524/461 X |
| 4,609,607 | 9/1986 | Takagi et al. | 430/137 X |
| 5,135,832 | 8/1992 | Sacripante et al. | 430/106.6 |

FOREIGN PATENT DOCUMENTS

| | | |
|---|---|---|
| 0054832 | 6/1982 | European Pat. Off. . |
| 0230041 | 7/1987 | European Pat. Off. . |
| 0255716 | 2/1988 | European Pat. Off. . |
| 0390527 | 10/1990 | European Pat. Off. . |
| 0430674 | 6/1991 | European Pat. Off. . |
| 146447 | 5/1992 | Japan ................ 430/137 |

*Primary Examiner*—Roland Martin
*Attorney, Agent, or Firm*—Oblon, Spivak, McClelland, Maier, & Neustadt

[57] ABSTRACT

Disclosed is a process for the preparation of a polymerization process toner for developing an electrostatic image which comprises the polymerization of a polymerizable monomer containing finely divided magnetic grains dispersed therein, a compound represented by formula R—(COOM)$_n$ being used as a dispersant, wherein n represents an integer 1 to 4, R represents an alkyl group (including phenyl-substituted alkyl group), an alkylene group (including a phenyl-substituted alkylene group), or a substituted or unsubstituted phenyl group, and M represents a hydrogen atom, alkaline metal or alkaline earth metal. The process provides an enhancement of pigment dispersability in a toner, giving a toner that provides a high image quality.

4 Claims, No Drawings

TONER FOR DEVELOPING ELECTROSTATIC IMAGE AND PROCESS FOR THE PREPARATION THEREOF

FIELD OF THE INVENTION

The present invention relates to a toner for developing an electrostatic image formed in electrophotography, electrostatic recording process, electrostatic printing process, etc. and a process for the preparation thereof.

BACKGROUND OF THE INVENTION

In general, the preparation of a magnetic toner is effected in the following manner. In some detail, a magnetic substance, a binder resin, a charge controlling agent, etc. are homogeneously mixed by means of a mixer such as ball mill and Henschel mixer, and then melt-kneaded by means of a kneading machine such as roll mill, extruder and kneader to cause the various constituent components to be fully dispersed in the binder resin. After a proper period of time, the material is finely divided by means of a jet mill or the like, and then classified by means of a pneumatic classifier to obtain a magnetic toner.

In order to enhance the dispersibility of a magnetic substance in a binder resin, an approach has been proposed which comprises the treatment of the surface of the magnetic substance with various substances for the purpose of enhancing the compatibility of the magnetic substance in an organic substance. For example, JP-A-53-81125 (The term "JP-A" as used herein means an "unexamined published Japanese Patent application") discloses a high molecular material as such a treatment. JP-A-54-127329 discloses a silane coupling agent. JP-A-55-28019 discloses a titanium coupling agent. These treatments are excellent in the enhancement of compatibility.

In a magnetic toner, however, a magnetic substance is adapted to be exposed somewhat on the surface of the toner so that excess electric charge is released to attain a proper electric charge. Therefore, the use of the foregoing treated magnetic substance may impair the surface hydrophilicity of the magnetic substance as well as give a greater polarization that prevents the release of electric charge. This will cause the toner to be excessively charged and scattered on the image, resulting in image roughness. This may also cause a density drop or unevenness in sleeve coat. This phenomenon is unavoidable under low humidity or in a high speed developing machine.

On the other hand, various magnetic substances have been prepared to obtain desired magnetic properties, electrical properties and powder properties. However, some of these magnetic substances cannot sufficiently release electric charge. Many magnetic substances cause image defects, though its extent is small as compared with the foregoing magnetic substances.

As approaches for enhancing the dispersibility of a magnetic substance there have been disclosed surface active agents in JP-A-53-137148, JP-A-59-126544, JP-A-59-125748, JP-A-59-137595, and JP-A-61-59349. These approaches are excellent in the enhancement of compatibility with a binder resin and thus provide stable electrification that gives a good image even under low humidity. Under high humidity, however, these approaches are often liable to the increase in the release of electric charge that causes a density drop, though being moisture-resistant in that no irreversible changes occur.

Further, a polymerization process has recently been employed to prepare a toner. Even the polymerization process requires the enhancement of pigment dispersibility. Examples of known polymerization processes include a process which comprises the use of a titanium or silane coupling agent as disclosed in JP-A-58-293759, JP-A-64-44456, and JP-A-2-32364, a process which comprises the use of an ester as disclosed in JP-A-59-125747, and JP-A-2-269365, and a process which comprises the use of physical dispersion as a means as disclosed in JP-A-2-256061. However, all these approaches, though providing a significant improvement in the dispersibility of a magnetic substance itself in a polymerizable monomer, are not necessarily satisfactory in that they have adverse effects on the formation of oil drops during suspension, cause heating during dispersion that leads to the deterioration of the polymerizable monomer, or have adverse effects on the charging behavior or electrical properties of the finished toner.

As previously mentioned, various proposals have been made on grinding process toner having an improved pigment dispersibility. However, no satisfactory polymerization processes have been obtained.

SUMMARY OF THE INVENTION

It is therefore an object of the present invention to provide a polymerization process developing toner which comprises a pigment homogeneously dispersed therein without deteriorating a polymerizable monomer and is excellent in various properties.

The foregoing object of the present invention will become more apparent from the following detailed description and examples.

The inventors have made extensive studies to accomplish the foregoing object of the present invention. As a result, it has been found that the use of finely divided magnetic grains having a specific compound adsorbed to, coated on or incorporated in the surface thereof causes the magnetic substance to be homogeneously dispersed in a polymerizable monomer, providing a better dispersibility of a magnetic substance in the final polymer resin without having adverse effects on various properties.

The magnetic toner according to the present invention has been worked out on the basis of the foregoing knowledge. More particularly, the magnetic toner according to the present invention comprises as a main component a magnetic substance having a specific carboxyl-containing dispersant or its derivatives, singly or in admixture, adsorbed thereto, coated thereon or incorporated therein.

The foregoing object of the present invention is accomplished by a process for the preparation of a polymerization process toner for developing an electrostatic image which comprises the polymerization of a polymerizable monomer containing finely divided magnetic grains dispersed therein, a compound represented by formula $R-(COOM)_n$ is used as a dispersant, in which n represents an integer 1 to 4, R represents an alkyl group (including phenyl-substituted alkyl group), an alkylene group (including a phenyl-substituted alkylene group), or a substituted or unsubstituted phenyl group, and M represents a hydrogen atom, alkaline metal or alkaline earth metal.

The foregoing object of the present invention is also accomplished with a toner for developing an electrostatic image prepared by a process which comprises the polymerization of a polymerizable monomer containing finely divided magnetic grains dispersed therein, a compound represented by formula R—(COOM)$_n$ is used as a dispersant, in which n represents an integer 1 to 4, R represents an alkyl group (including phenyl-substituted alkyl group), an alkylene group (including a phenyl-substituted alkylene group), or a substituted or unsubstituted phenyl group, and M represents a hydrogen atom, alkaline metal or alkaline earth metal.

DETAILED DESCRIPTION OF THE INVENTION

The compound represented by formula R—(COOM)$_n$-(carboxyl-containing dispersant) which is used in the present invention will be explained in more detail below.

Where R is an alkyl group, the moiety (COOM)$_n$ means an alkyl group which has 1 to 4 COOM(s) and which is bonded to the alkyl group represented by R to form the compound. The number of carbon atoms (excluding that of carbon atoms in COOM) in the compound is preferably from 6 to 30. The compound may be substituted by a phenyl group and may contain a unsaturated bonding(s).

Where R is an alkylene group, n=2. The alkylene group is bonded to two COOMs on the both terminals. The alkylene group having 1 to 24 carbon atoms is preferred. The alkylene group may be substituted by a phenyl group and may contain a unsaturated bonding(s).

When R is a substituted or unsubstituted phenyl group, the substituted or unsubstituted phenyl group is bonded to one COOM and further may have 1 to 3 COOM(s) in place of the hydrogen atom(s) attached to carbon atoms constituting the phenyl group.

The preferred process for the preparation of the toner according to the present invention is as follows.

Predetermined amounts of a magnetic substance having the specific carboxyl-containing dispersant or the like adsorbed thereto, coated thereon or incorporated therein, a coloring agent, a low molecular polyolefin, a polymerization initiator, and other additives are added to a polymerizable monomer. The mixture is thoroughly stirred and dispersed by means of a sand stirrer or the like to obtain a polymerizable composition. The polymerizable composition is then added to an aqueous suspension medium containing a suspension stabilizer. The mixture is then subjected to dispersion and suspension by means of a high speed agitator so that the droplets are kept in a droplet diameter necessary for toner as the polymerization reaction proceeds. The polymerizable composition in the form of fine oil drops in the suspension medium are polymerized and solidified as it is to obtain a toner containing a coloring agent, finely divided grains of olefin, etc. The grain diameter of the resulting toner is determined by the dispersion conditions of the suspended polymerizable composition.

Preferred examples of radically polymerizable monomers employable in the present invention include styrene monomers such as styrene, o-methylstyrene, m-methylstyrene, p-methylstyrene, α-methylstyrene, p-ethylstyrene, 2,4-dimethylstyrene, p-butylstyrene, p-t-butylstyrene, p-hexylstyrene, p-octylstyrene, p-nonylstyrene, p-decylstyrene, p-dodecylstyrene, p-methoxystyrene, p-phenylstyrene, p-chlorostyrene and 3,4-dichlorostyrene. Other examples of radically polymerizable monomers employable in the present invention include ethylenically unsaturated monoolefins such as ethylene, propylene, butylene and isobutylene, halogenated vinyls such as vinyl chloride, vinylidene chloride, vinyl bromide and vinyl fluoride, vinylesters such as vinyl acetate, vinyl propionate, vinyl benzoate and vinyl butyrate, α-methylene aliphatic monocarboxylic esters such as methyl acrylate, ethyl acrylate, butyl acrylate, propyl acrylate, octyl acrylate, dodecyl acrylate, lauryl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, butyl methacrylate, isobutyl methacrylate, octyl methacrylate, dodecyl methacrylate, lauryl methacrylate, 2-ethylhexyl methacrylate, stearyl methacrylate, phenyl methacrylate, dimethylaminoethyl methacrylate and diethylaminoethyl methacrylate, acrylic acid or methacrylic acid derivatives such as acrylonitrile, methacrylonitrile and acrylamide, vinylethers such as vinyl methyl ether, vinyl ethyl ether and vinyl isobyl ether, vinyl ketones such as vinyl methyl ketone, vinyl hexyl ketone and methyl isopropenyl ketone, N-vinyl compounds such as N-vinylpyrrole, N-vinylcarbazole, N-vinylindole and N-vinylpyrrolidone, and vinyl naphthalenes. These monomers may be used singly or in combination. These monomers may also be used in such a combination that they are polymerized to give a copolymer.

For the polymerization of these monomers, a radical polymerization initiator is normally used in an amount of 0.1 to 10% by weight based on the weight of the radically polymerizable monomer. The appropriate amount of such a radical polymerization initiator is determined by the final polymerization degree.

Specific examples of such a polymerization initiator include peroxides such as acetylcyclohexylsulfonyl peroxide, isobutyl peroxide, diisopropylperoxy dicarbonate, di-2-ethylhexylperoxy dicarbonate, 2,4-dichlorobenzoyl peroxide, 1-butylperoxy pivalate, 3,5,5-trimethylhexanoyl peroxide, octanoyl peroxide, stearoyl peroxide, propionyl peroxide, succinic acid peroxide, acetyl peroxide, t-butylperoxy-2-ethylhexanoate, benzoyl peroxide, parachlorobenzoyl peroxide, t-butylperoxy isobutyrate, t-butylperoxymaleic acid, t-butylperoxy laurate, cyclohexanone peroxide, t-butylperoxyisopropyl carbonate, 2,5-dimethyl-2,5-dibenzoylperoxyhexane, t-butylperoxyacetate, t-butylperoxybenzoate, diisobutyldiperoxyphalate, methyl ethyl ketone peroxide, dicumyl peroxide, 2,5-dimethyl-2,5-di-t-butylperoxyhexane, t-butylcumyl peroxide, t-butyl hydroperoxide, di-t-butyl peroxide, 2,5-dimethyl-2,5-di-t-butylperoxyhexane, diisopropylbenzene hydroperoxide, paramethane hydroperoxide, pinane hydroperoxide, 2,5-dimethylhexane-2,5-dihydroperoxide and cumen hydroperoxide, and azo compounds such as 2,2'-azobisisobutyronitrile, 1,1'-azobis(cyclohexane-1-carbonitrile), 2,2'-azobis(4-methoxy-2,4-dimethylvaleronitrile), 2,2'-azobis(2,4-dimethylvaleronitrile), 2,2'-azobis(2-cyclopropylpropionitrile), 2,2'-azobis(2-methylbutyronitrile) and dimethyl-2,2'-azobis(2methylpropionate).

The polymer according to the present invention may be a crosslinked polymer obtained by the polymerization in the presence of a crosslinking agent. The crosslinking agent which can be preferably used is a compound mainly having two or more polymerizable double bonds. For example, aromatic divinyl compounds such as divinylbenzene, divinylnaphthalene and derivatives thereof, including diethylenic carboxylic ester (e.g., ethyleneglycol dimethacrylate, diethyleneglycol dimethacrylate, triethyleneglycol dimethacrylate, trimethylolpropane triacrylate, allyl methacrylate, tetraethyleneglycol dimethacrylate, 1,3-butanediol dimethacrylate ), all divinyl compounds (e.g., N,N-divinylaniline, divinylether, divinylsulfide, divinylsulfone), and compounds having three or more vinyl groups, may be used singly or in admixture.

The amount of such a crosslinking agent to be incorporated in the monomer is generally in the range of 0.005 to 20% by weight, preferably 0.1 to 5% by weight. If this amount exceeds the above specified range, it raises the softening point of the product and hence can impair the fixability of the toner. On the contrary, if this amount falls below the above specified range, properties such as durability, preservability and abrasion resistance can hardly be imparted to the toner. In particular, it reduces the effect of inhibiting the expansion of the distribution of molecular weight of the polymer by crosslinking and offset during fixing by the nature of crosslinked polymer toner itself in heat roll fixing process copying machines or the like.

The low molecular polyolefin employable in the present invention may be either a homopolymer made of a single olefin monomer or a copolymer obtained by the copolymerization of such an olefin monomer with other monomers copolymerizable therewith. The use of the low molecular polyolefin having a mean molecular weight of from 1,500 to 6,000 is preferred.

Examples of the foregoing olefin monomer include ethylene, propylene, 1-butene, 1-pentene, 1-hexene, 1-heptene, 1-octene, 1-nonene, 1-decene, isomers of these olefin momomers which have unsaturated bonds in different positions, olefins obtained by adding branches made of alkyl group to these olefins, e.g., 3-methyl-1-butene, 3-methyl-2-pentene and 3-propyl-5-methyl-2-hexene, and all other olefin monomers. Particularly preferred among these olefin monomers are ethylene, and propylene.

Examples of other monomers copolymerizable with olefin monomers include other vinyl ethers, vinyl esters, haloolefins, acrylic esters or methacrylic esters of other olefin monomers, and organic acids such as acrylic acid derivative and itaconic acid.

Further, modified polyolefins obtained by blocking or grafting with other components may be used.

Specific examples of polyolefins useful in the present invention include Biscol 330P, Biscol 550P and Biscol 660P (polypropylene available from Sanyo Chemical Industries, Ltd.), Hiwax 320P, Hiwax 310P, Hiwax 410P, Hiwax 405P, Hiwax 400P and Hiwax 200P (polyethylene available from Mitsui Petrochemical Industries, Ltd.), Sanwax 131P, Sanwax 151P, Sanwax 161P, Sanwax 165P, and Sanwax 171P (polyethylene available from Sanyo Chemical Industries, Ltd.), and Polywax 400, Polywax 500, Polywax OH465, and Polywax 1040 (polyethylene available from Toyo Petlighte Co., Ltd.). However, the polyolefin to be used in the present invention is not limited to these compounds.

These polyolefins may be used singly or in combination. The amount of such a polyolefin to be used is preferably in the range of 1 to 10% by weight, particularly 2 to 7% by weight based on the weight of the polymerizable monomer.

Further, a known charge controlling agent may be used as necessary. Examples of such a charge controlling agent include metal complex azo compounds, salicylic metal complex compounds, alkylammonium compounds, and azinic compounds.

Examples of the specific carboxyl-containing dispersant for magnetic substance include polyvalent carboxylic acids such as malonic acid, succinic acid, methylsuccinic acid, glutaric acid, sebacic acid, adipic acid, 1,1-dimethyl-1,3-dicarboxypropane, 3-methyl-3-ethylglutaric acid, aliphatic dicarboxylic acid ($C_9$–$C_{13}$), maleic aliphatic acid ($C_{10}$–$C_{24}$), butane-1,2,3-tricarboxylic acid, and butanetetracarboxylic acid. Further, higher aliphatic acids such as lauric acid, myristic acid, palmitic acid, stearic acid, oleic acid, linoleic acid, montanic acid and behenic acid may be used. Metallic salts of these higher aliphatic acids are useful as well. Further examples of dispersants employable in the present invention include aromatic carboxylic acids such as benzoic acid, alkylbenzoic acid ($C_1$–$C_{10}$), orthophthalic acid, isophthalic acid, terephthalic acid, toluenedicarboxylic acid, monoalkyl phthalate ($C_1$–$C_{10}$), benzenetricarboxylic acid, benzenetetracarboxylic acid, aminobenzoic acid, N-methylaminobenzoic acid, m-dimethylaminobenzoic acid, hydroxybenzoic acid, and dihydroxybenzoic acid. These dispersants may be used singly or in admixture.

As the magnetic substance there may be used any of magnetic substances which have been heretofore used for magnetic toner. For example, finely divided grains of a metal such as iron, nickel and cobalt, iron compound such as various ferrites and magnetites, or alloy or oxide of nickel, cobalt, manganese, copper and aluminum having a grain diameter of about 0.1 to 5 μm, preferably 0.1 to 1 μm may be used. Specific examples of such a magnetic substance include RB-BL, BL-50, BL-100, BL-200, BL-250, BL-500, BL-SP (available from Titan Kogyo K.K.), EPT-500, EPT-1000, MBM-B-450, and MTC-720 (available from Toda Kogyo Corp.). Such a magnetic substance may be used in a proportion of 20 to 70% by weight, preferably 35 to 65% by weight based on the weight of toner.

The treatment of such a magnetic substance with the foregoing compound may be effected by, e.g., a process which comprises dissolving the foregoing compound in a solvent such as toluene, mixing the solution with an appropriate amount of such a magnetic substance, and then distilling off the solvent or a process which comprises spraying the solution of the foregoing compound on the surface of such a magnetic substance, and then drying the material so that the foregoing compound is adsorbed to the magnetic substance. Examples of the useful solvent other than toluene include methanol, ethanol, isopropanol, xylene, methylene chloride and dichloroethane.

The amount of the foregoing compound to be used is preferably in the range of 0.01 to 10 parts by weight, more preferably 0.1 to 5 parts by weight based on 100 parts by weight of magnetic substance. If this amount falls below 0.01 parts by weight, the additive doesn't exert its effects. On the contrary, if this amount exceeds 10 parts by weight, it causes poor electrification under high humidity, resulting in a image density drop.

In suspension polymerization, polymerizable compositions are dispersed and suspended in a suspension medium such as water in the form of finely divided grains having a desired droplet diameter by mechanical agitation to undergo polymerization. It is necessary that suspended droplets be prevented from agglomerating to larger droplets due to growing tackiness with the progress of polymerization. To this end, a suspension stabilizer is used.

Such suspension stabilizers are generally classified as water-soluble high molecular substance in the form of finely divided grains or slightly-soluble inorganic compound in the form of finely divided grains. The former includes gelatin, starch, polyvinyl alcohol, etc. The latter includes slightly-soluble salts such as barium sulfate, barium carbonate, calcium carbonate and calcium phosphate, combination of slightly-soluble salts and surface active agents such as sodium dodecylbenzenesulfonate and sodium dodecylsulfate, oxides of inorganic high molecular metal compounds such as talc, clay silicate and diatomaceous earth, in the form of powder. In the case where when a polymerizable composition containing an ionic substance such as cationic or anionic substance, e.g., nitrogen-containing polymerizable monomer or slightly-soluble amine is dispersed in water, dispersed droplets are charged either positively or negatively, an ionic dispersant which is charged to the other polarity, such as negatively chargeable colloidal silica or positively chargeable aluminum oxide may be effectively used as a suspension stabilizer.

The present invention will be further described in the following examples, but the present invention should not be construed as being limited thereto. The term "parts" as used herein indicates the weight parts relative to the same weight unit.

PREPARATION EXAMPLE 1

To 40 parts of a magnetic substance A (magnetic iron oxide) was added 1 part of oleic acid. The mixture was then stirred by means of a ball mill for 15 minutes to obtain a magnetic substance B.

PREPARATION EXAMPLE 2

A magnetic substance D was prepared in the same manner as in Preparation Example 1 except that a magnetic substance C (magnetic iron oxide) was used instead of the magnetic substance A and 2 parts of a xylene solution obtained by dissolving 20 parts of malonic acid in 100 parts of xylene was added thereto.

The properties of the magnetic substances A and C (untreated magnetic substances) used are set forth in Table 1.

TABLE 1

|  | Magnetic substance A | Magnetic substance C |
| --- | --- | --- |
| Hc (Oe) | 40 | 135 |
| σs (emu/g) | 86 | 83 |
| Specific surface area (m$^2$/g) | 4.5 | 8.5 |
| Grain diameter (μm) | 0.3 | 0.2 |

EXAMPLE 1

| Styrene-butyl acrylate-divinylbenzene | 100 parts |
| --- | --- |
| Magnetic substance B | 40 parts |
| Biscol 550P (Sanyo Chemical Industries, Ltd.) | 4 parts |
| Charge controlling agent TRH (Hodogaya Chemical Industries, Ltd.) | 2 parts |
| 2,2'-Azobisisobutyronitrile | 3 parts |

These components were mixed and dispersed at 10,000 rpm by means of TK homomixer (available from Tokushu Kika Kogyo K.K.) to obtain a polymerizable composition. The polymerizable composition was then dissolved in water containing calcium tertiary phosphate as suspension stabilizer in an amount of 4.5% by weight based on the weight of polymerizable composition and sodium dodecylbenzenesulfonate in an amount of 0.04% by weight based on the weight of polymerizable composition in a proportion of 20% by weight. A high speed shearing force (8,000 rpm) was then applied to the solution by means of TK homomixer so that the polymerizable composition was dispersed in water in the form of droplets having a size of about 10 μm to obtain suspended droplets of polymerizable composition. The size of the droplets was measured by means of SK LASER MICRON SIZER PRO-7000S (available from Seishin Kigyo Co., Ltd.). The suspension was then allowed to undergo polymerization with stirring at a temperature of 65° C. in a flask equipped with a condenser, a thermometer and a nitrogen intake tube for 10 hours. After the completion of polymerization, hydrochloric acid was added to the reaction system, and calcium tertiary phosphate was removed from the reaction system. The reaction system was washed with water, and then dried to obtain a toner having an average grain diameter of 10.1 μm as Toner 1.

As a measure of pigment dispersibility, the value of dielectric dissipation factor was used. The smaller the value of dielectric dissipation factor is, the better is the pigment dispersibility. The dielectric dissipation factor is the tangent of the dielectric loss angle (value obtained by subtracting the dielectric phase angle from 90°), which is measured under the following conditions. In some detail, the material is pressed under a load of 200 kgf/cm$^2$ for 60 seconds to prepare a disk having a thickness of 2 mm and a diameter of 50 mm. The disk is then clamped between two electrodes (Type SE-30 electrode available from Ando Electric Co., Ltd.). The disk is then removed while the gap between the electrodes being kept equal to the thickness of the disk. The zero adjustment of LCR meter (Type 4274A, available from YHP Co., Ltd.) is then conducted. The disk is again clamped between the electrodes. The capacitance and dielectric dissipation factor of the specimen is then read from LCR meter display.

The results show that Toner 1 exhibits a dielectric dissipation factor of $29 \times 10^{-3}$ and an excellent pigment dispersibility. The magnetic toner was provided with frictional charge. The magnetic toner was then used to develop a negative electrostatic image formed on an organic semiconductor photoreceptor to form an image which was then transferred to an ordinary paper. The image was then heat-fixed. The quality of the resulting image was so good that its density was good and no fog was observed.

EXAMPLE 2

Toner 2 having a size of 9.89 μm was prepared in the same manner as in Example 1 except that the magnetic substance B was replaced by a magnetic substance D. Toner 2 thus obtained exhibited a dielectric dissipation factor of $40 \times 10^{-3}$. The toner also exhibited an excellent pigment dispersibility. The toner provided an excellent image.

EXAMPLE 3

Toner 3 having a size of 9.81 μm was prepared in the same manner as in Example 2 except that the magnetic substance D was replaced by the magnetic substance A and linoleic acid was added to the polymerizable composition as a pigment dispersant. Toner 3 thus obtained exhibited a dielectric dissipation factor of $41 \times 10^{-3}$. The toner also exhibited an excellent pigment dispersibility. The toner provided an excellent image.

COMPARATIVE EXAMPLE 1

Toner 4 having a size of 9.93 μm was prepared in the same manner as in Example 1 except that the magnetic substance used was replaced by the magnetic substance C. Toner 4 thus obtained exhibited a dielectric dissipation factor of $345 \times 10^{-3}$. The toner also exhibited a very poor pigment dispersibility. Further, the quality of the resulting image was so poor that it exhibited a low image density.

COMPARATIVE EXAMPLE 2

Toner 5 having a size of 10.3 μm was prepared in the same manner as in Example 3 except that linoleic acid to be used as a pigment dispersant was replaced by a titanium coupling agent. The toner exhibited a dielectric dissipatation factor of $89 \times 10^{-3}$. The toner also exhibited a poor pigment dispersibility. The resulting image exhibited a poor quality.

The results of Toners 1 to 5 are set forth in Table 2.

TABLE 2

| Toner | Dielectric dissipation factor (dispersibility) | Image density | Fog |
|---|---|---|---|
| 1 | $29 \times 10^{-3}$ (Good) | Good | G |
| 2 | $40 \times 10^{-3}$ (Good) | Good | G |
| 3 | $41 \times 10^{-3}$ (Good) | Good | G |
| 4 | $345 \times 10^{-3}$ (Poor) | Poor | P |
|  | $89 \times 10^{-3}$ (Fair) | Poor | F |

Fog: G: Little or no fog; F: Some fog observed; P: Considerable fog observed

As mentioned above, the dispersibility of a pigment in a toner depends on the kind of a pigment dispersant used. In accordance with the present invention, the use of a carboxyl-containing dispersant provides an enhancement of pigment dispersibility in a toner, giving a toner that provides a high image quality.

While the invention has been described in detail and with reference to specific embodiments thereof, it will be apparent to one skilled in the art that various changes and modifications can be made therein without departing from the spirit and scope thereof.

What is claimed is:

1. A process for the preparation of a polymerization process toner for developing an electrostatic image which comprises polymerizing a) a polymerizable monomer; and
   b) finely divided magnetic grains wherein said magnetic grains have adsorbed thereto, coated thereon or incorporated therein, 0.01 to 10 parts by weight based on 100 parts by weight of said magnetic grains, of a compound represented by formula $R—(COOM)_n$, wherein n represents an integer of from 1 to 4, R is selected from the group consisting of an alkyl group, a phenyl substituted alkyl group, an alkylene group, a phenyl substituted alkylene group, a phenyl group, or a substituted phenyl group, and M is selected from the group consisting of a hydrogen atom, an alkali metal or an alkaline earth metal.

2. The process for the preparation of a polymerization process toner for developing an electrostatic image of claim 1, wherein the compound represented by formula $R—(COOM)_n$ is selected from the group consisting of malonic acid, succinic acid, methylsuccinic acid, glutaric acid, sebacic acid, adipic acid, 1,1-dimethyl-1,3-dicarboxypropane, 3-methyl-3-ethylglutaric acid, aliphatic dicarboxylic acid having 9 to 13 carbon atoms, maleic aliphatic acid having 10 to 24 carbon atoms, butane-1,2,3-tricarboxylic acid, butanetetracarboxylic acid, lauric acid, myristic acid, palmitic acid, stearic acid, oleic acid, linoleic acid, montanic acid, behenic acid and metallic salts of these acids, and benzoic acid, alkylbenzoic acid having 1 to 10 carbon atoms, orthophthalic acid, isophthalic acid, terephthalic acid, toluenedicarboxylic acid, monoalkyl phthalate having 1 to 10 carbon atoms, benzenetricarboxylic acid, benzenetetracarboxylic acid, aminobenzoic acid, N-methylaminobenzoic acid, m-dimethylaminobenzoic acid, hydroxybenzoic acid and dihydroxybenzoic acid.

3. The process for the preparation of a polymerization process toner for developing an electrostatic image of claim 1, wherein the magnetic grains are selected from the group consisting of iron, nickel, cobalt, iron compound, and alloy or oxide of nickel, cobalt, manganese, copper and aluminum, and have an average grain diameter of about 0.1 to 5 μm.

4. A toner for developing an electrostatic image prepared by a process which comprises polymerizing a) a polymerizable monomer; and
   b) finely divided magnetic grains wherein said magnetic grains have adsorbed thereto, coated thereon or incorporated therein, 0.01 to 10 parts by weight based on 100 parts by weight of said magnetic grains, of a compound represented by formula $R—(COOM)_n$, wherein n represents an integer of from 1 to 4, R is selected from the group consisting of an alkyl group, a phenyl substituted alkyl group, an alkylene group, a phenyl substituted alkylene group, a phenyl group, or a substituted phenyl group, and M is selected from the group consisting of a hydrogen atom, an alkali metal or an alkaline earth metal.

* * * * *